United States Patent
Maughan et al.

[11] Patent Number: 5,904,436
[45] Date of Patent: May 18, 1999

[54] DRY WEDGE BALL AND SOCKET JOINT

[75] Inventors: Garth B. Maughan, Delta; Richard F. Brown, Temperance, both of Ohio

[73] Assignee: Dana Corporation, Toledo, Ohio

[21] Appl. No.: 08/886,768

[22] Filed: Jul. 2, 1997

[51] Int. Cl.[6] .................................................. F16C 11/06
[52] U.S. Cl. ........................ 403/140; 403/135; 29/441.1; 29/898.048
[58] Field of Search .................................. 403/135, 131, 403/122, 140, 128, 139, 132, 137, 133; 29/441.1, 898.044, 898.047, 898.048, 898.05

[56] References Cited

U.S. PATENT DOCUMENTS

| | | | |
|---|---|---|---|
| 2,361,025 | 10/1944 | Graham et al. | 403/133 X |
| 3,162,930 | 12/1964 | Litsky | 299/441.1 X |
| 3,266,123 | 8/1966 | McCloskey | 29/441.1 X |
| 3,429,598 | 2/1969 | Scheublein, Jr. et al. | 287/87 |
| 3,452,415 | 7/1969 | Beazley et al. | 29/149.5 |
| 3,458,223 | 7/1969 | White | 403/140 X |
| 3,562,885 | 2/1971 | McCloskey | 29/441.1 X |
| 3,594,049 | 7/1971 | Turner | 29/898.047 X |
| 3,848,272 | 11/1974 | Noiles | 3/1 |
| 4,026,657 | 5/1977 | Chmura | 403/122 |
| 4,137,618 | 2/1979 | Krauss | 29/898.05 |
| 4,231,673 | 11/1980 | Satoh et al. | 403/135 X |
| 4,674,164 | 6/1987 | McCloskey | 29/441.1 X |
| 4,790,682 | 12/1988 | Henkel | 403/140 |
| 4,903,386 | 2/1990 | Teramachi | 29/441.1 X |
| 4,904,106 | 2/1990 | Love | 403/39 |
| 5,297,445 | 3/1994 | Chen | 74/551.3 |
| 5,772,337 | 6/1998 | Maughan et al. | 403/140 X |

FOREIGN PATENT DOCUMENTS

| | | | |
|---|---|---|---|
| 131810 | 3/1949 | Australia | 403/132 |
| 919284 | 11/1946 | France | 403/132 |
| 1019176 | 2/1966 | United Kingdom | 403/139 |

*Primary Examiner*—Harry C. Kim
*Attorney, Agent, or Firm*—Rader, Fishman & Grauer PLLC

[57] ABSTRACT

A ball and socket joint is disclosed. The joint comprises two hard, self-adjusting, tapered side bearing halves with inner spherical faces. The inner spherical faces are lined with a low friction synthetic filament impregnated fabric overlay bonded to the spherical face by stiff reinforced polymer based adhesives, ceramic based adhesives or other high temperature adhesives. The bearing halves receive a ball stud sphere and are compression pre-loaded into a socket. Bearing taper is controlled so that minute filament particles fill microscopic low places of the stud sphere as the sphere moves or articulates within the bearing against the compressed fabric overlay. The sphere becomes very smooth and minimizes friction within the joint and improves bearing life and performance of the joint. The fabric may also be bonded to an inner surface of a hemispherical cup which is placed adjacent the bearing halves prior to assembly of the joint.

22 Claims, 4 Drawing Sheets

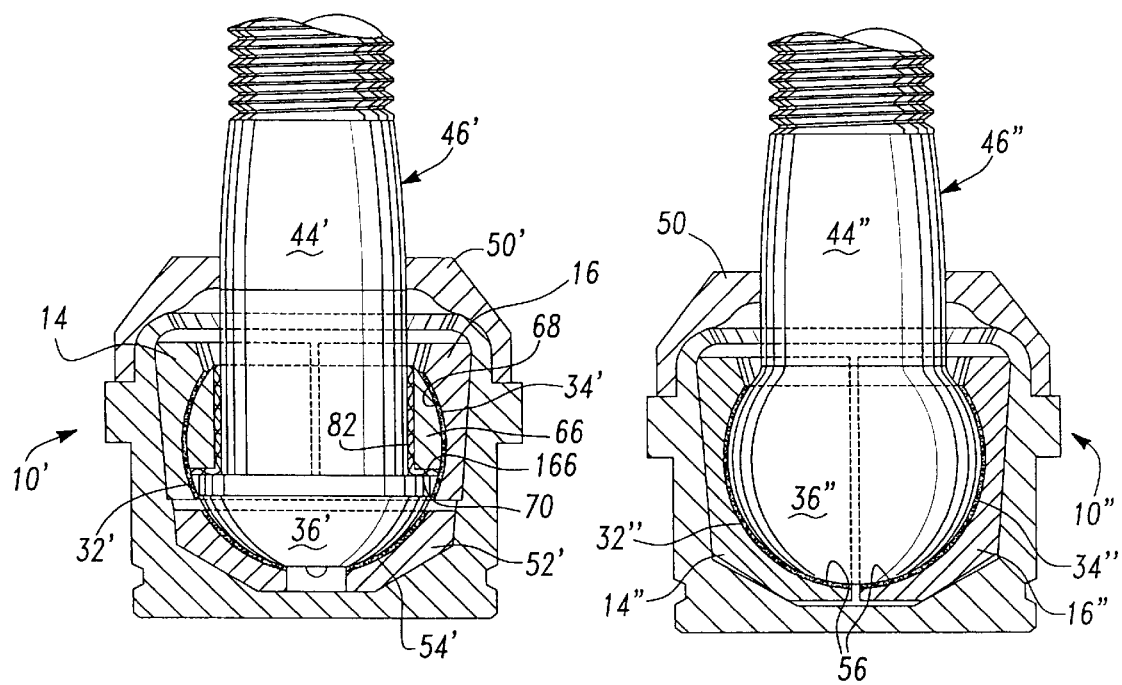
Fig-4
Fig-5
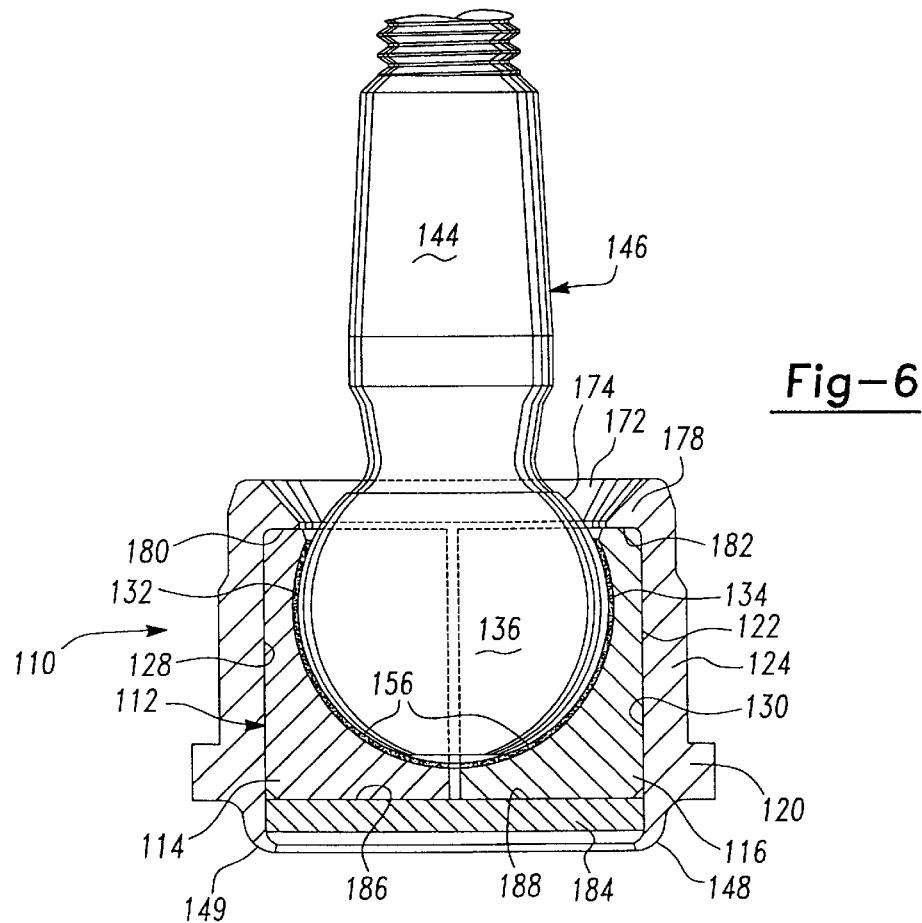
Fig-6

DRY WEDGE BALL AND SOCKET JOINT

FIELD OF THE INVENTION

This invention relates in general to ball joint assemblies. It relates more particularly to a ball joint assembly of the type which is normally used for connecting movable parts in a vehicle suspension system.

BACKGROUND OF THE INVENTION

Ball and socket joints are used in a variety of applications, including rack and pinion inner tie rod socket assemblies, steering knuckles, drag links and connecting rod assemblies. Ball and socket joints typically include a generally cylindrical socket member adapted to receive a compressed bearing together with a head of a ball stud. The compressed bearing reduces the friction level between the socket and ball stud head. Over time, the bearing expands to compensate for wear.

Ball and socket joints including bearing halves have known disadvantages. In particular, existing joint bearing halves can adapt for only limited wear, resulting in a loose fit between the bearing and the stud head. Over time, when a joint becomes less tight, stud rotating torque decreases and axial end play increases, decreasing joint performance and resulting in potential joint failure.

The prior art teaches the use of a two-piece bearing set which promotes easier joint assembly and a tighter joint. However, an excessive compression pre-load may be applied such that the bearing plastically deforms. When a bearing plastically deforms there is a lack of balance between elasticity or shock absorption and compressibility or torque control.

Further, the need for materials having low friction characteristics for maximum joint life tends to dictate the use of synthetic non-metallic bearing materials. But the surface of the ball stud is usually machined, leaving microscopic imperfections thereon. Any imperfections in the ball tend to deteriorate the inner bearing surface and reduce the ability of the bearing to lubricate the ball joint. Abrupt or sharp edges on the ball surface also tend to remove lubrication from the bearing surface, increasing joint friction. The inner bearing surface of "dry" bearing halves (bearing halves with no added lubrication) may become damaged and/or scored due to surface irregularities of the ball stud.

SUMMARY OF THE INVENTION

The present invention relates to an improved ball and socket joint which includes a metallic or very hard polymeric two-piece "hard" bearing set. The bearing set includes an inner bearing surface lined with a fabric overlay impregnated with a low friction synthetic filament, such as polytetraflouroethylene (PTFE), which allows minute particles of filament to fill microscopic low places of the ball stud sphere until an equilibrium exists between the overlay and the stud sphere.

The present invention comprises a bearing with two metallic, self-adjusting, tapered side bearing halves having inner spherical faces which receive a ball stud sphere. The two halves are assembled to the sphere and are joined along an axially extending parallel line. The assembly is then compression pre-loaded within a socket. Preferably, the inner spherical faces of the metallic bearing halves are lined with PTFE-impregnated fabric overlays bonded to the spherical face by stiff reinforced polymer based adhesives, ceramic based adhesives or other high temperature adhesives.

Because the bearing halves are formed from hard materials, the compression pre-load results in an extremely tight fit of the bearing halves within the socket and of the fabric overlay against the ball stud sphere. The bearing taper is controlled so that minute particles of synthetic filament fill microscopic low places of the stud sphere as the sphere moves or articulates within the bearing against the compressed fabric overlay. Once low places are filled with minute filament particles, the ball stud head becomes very smooth, and friction within the joint is minimized. The smooth head also does not deteriorate the inner bearing surface within the joint. And because each bearing component is hard, plastic deformation of the bearing halves is prevented during compression pre-load and during use of the joint. Thus, the bearing life and the life of the joint are greatly increased.

BRIEF DESCRIPTION OF THE DRAWINGS

The features and inventive aspects of the present invention will become more apparent upon reading the following detailed description, claims, and drawings, of which the following is a brief description.

FIG. 4 is a cross-sectional view of a second embodiment of the present invention.

FIG. 5 is a cross-sectional view of a third embodiment of the present invention.

FIG. 6 is a cross-sectional view of a fourth embodiment of the present invention.

DETAILED DESCRIPTION OF A PREFERRED EMBODIMENT

Figure 1:
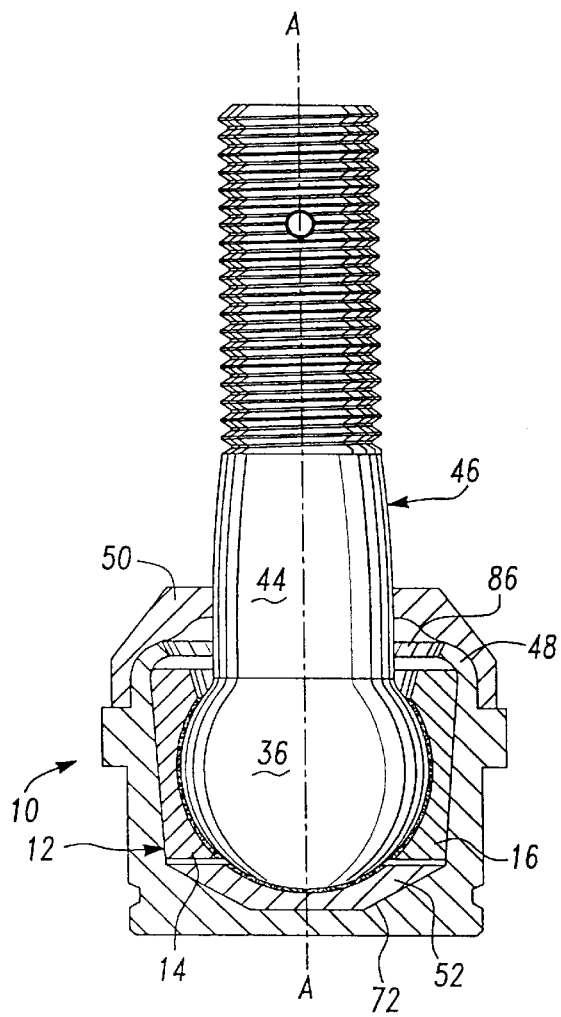
FIG. 1 is a cross-sectional view of a first embodiment of the ball and socket joint of the present invention.

A ball and socket joint 10 is shown in FIGS. 1 through 4 which includes a bearing set 12 comprising symmetric tapered bearing halves 14 and 16. Metallic or very hard polymeric bearing halves 14 and 16 are received in a cavity 18 of a socket 20. Cavity 18 is defined by an inner peripheral surface 22 of a socket side wall 24 and a frusto-conical floor 26. Cavity 18 extends axially about an axis of symmetry A-A.

Bearing halves 14 and 16 include tapered outer peripheral surfaces 28 and 30 which are adapted to conform to inner peripheral surface 22 of cavity 18. Bearing halves 14 and 16 further include inner spherical surfaces 32 and 34 formed in the bearing halves 14 and 16 such that a stud head 36 engages inner surfaces 32 and 34. Bearing halves 14 and 16 fit about stud head 36 such that a slot 38 formed by a separation between the bearing halves extends parallel to the axis of symmetry A-A of cavity 28. Bearing halves 14 and 16 further include transition zones 40 and 42 which engage shank 44 of ball stud 46 near the point where stud head 36 connects with shank 44.

Socket 20 includes an upper axial surface 48 which acts as a compression rim to engage an annular retaining ring 50. Retaining ring 50 is generally formed from steel. When socket 20 is closed, bearing set 12 is both axially and radially compression pre-loaded by being forced into cavity 18 of socket 20. The generally cylindrical tapered outer peripheral surfaces 28 and 30 of symmetric bearing halves 14 and 16 have an unloaded diameter greater than the corresponding unloaded diameter of inner peripheral surface 22 of socket 20. Bearing halves 14 and 16 are placed about stud head 36, and the assembly is forced into socket 20. Because outer peripheral surfaces 28 and 30 have an unloaded diameter greater than that of inner peripheral surface 22, bearing halves 14 and 16 are compressed, and exert a compression pre-load upon stud head 36. The taper of outer peripheral surfaces 28 and 30 may be adjusted to control the amount of force exerted against stud head 36 when the assembly is forced into socket 20. Further, the compression pre-load is carried between outer surfaces 28 and 30 to inner peripheral surface 22 of socket 20.

In a preferred embodiment, bearing set 12 further includes a wedge-shaped lower seat 52 having a generally frusto-conical nose 72. Lower seat 52 is preferably formed from a self-lubricating polymer, and has a concave upper surface 54 for supporting stud head 36. Inner spherical seat faces 32 and 34 and upper surface 54 all share a common diameter and engage head 36 to limit its degrees of freedom to rotational motion about a common center point. Frusto-conical nose 72 is sized to conform with and mate to frusto-conical floor 26 of socket 20. Nose 72 has a frusto-conical shape that permits easier molding of the seat 52. Nose 72 also provides greater load support because of an increased bearing surface area, less axial end play and radial lash, and improved joint tightness without increasing rotating torque value.

Preferably, inner spherical seat faces 32 and 34 of symmetric bearing halves 14 and 16 are lined with a polytetra-flouroethylene (PTFE) impregnated fabric overlay 56 which is bonded to the spherical faces 32, 34 by means of a stiff reinforced polymer 58. Overlay 56 may be impregnated with any low friction synthetic filament. Additionally, polymer 58 may be a ceramic base material or other high temperature adhesive. Fabric 56 may also be polymer based. Depending upon the extent and type of loading for which the joint is designed, surface 54 of seat 52 may also include a PTFE-impregnated fabric bonded thereto. This option is discussed in greater detail below.

Figure 2:
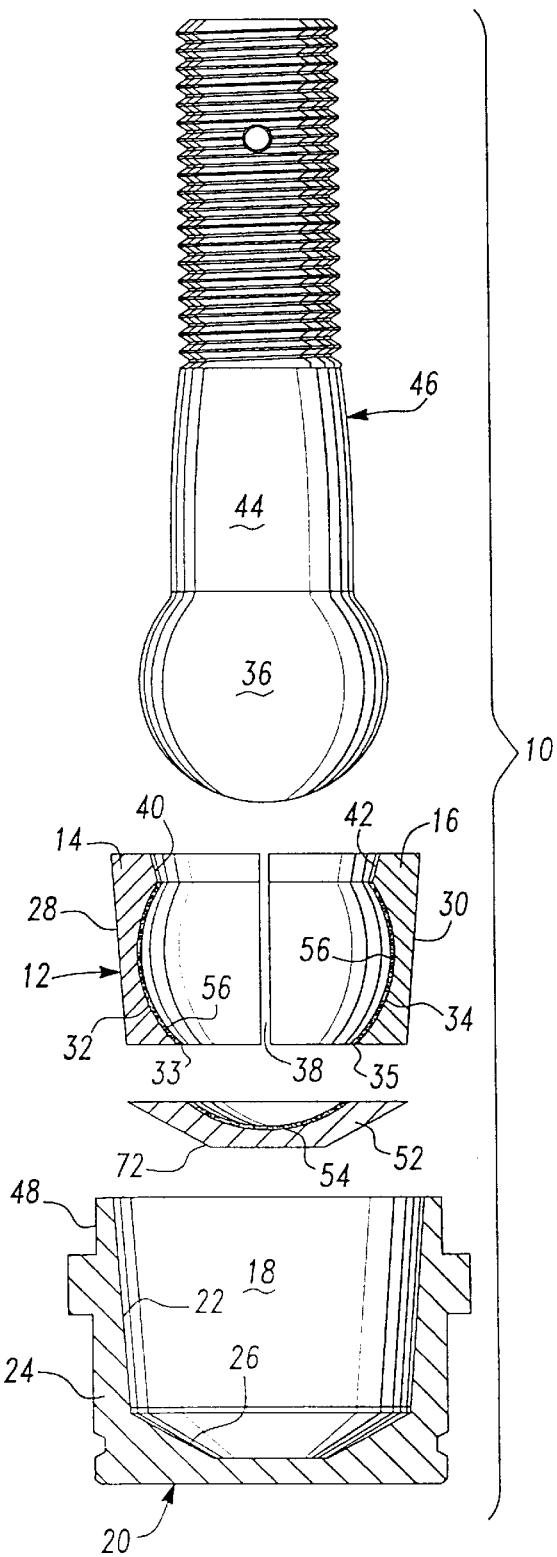
FIG. 2 is a cross-sectional exploded view of the first embodiment showing the various joint components.

A cross-sectional view of joint 10 is illustrated in FIGS. 1 and 2. Symmetric tapered bearing halves 14 and 16 are placed about stud head 36 such that inner spherical seat faces 32 and 34, including overlay 56, contact stud head 36, and slot 38 is formed between the bearing halves. The sub-assembly is then inserted into cavity 18 of socket 20. The joint is sealed by closing socket 20, which is typically a forging or a casting. An annular lip 86 of upper axial surface 48 of socket 20 is crimped toward shank 44 of ball stud 46. Lip 86 is sized to ensure adequate resistance against severe loading "push out." Further, to close socket 20, an axial load is applied to retaining ring 50 which is transferred to annular lip 86 to prevent disassembly of ball and socket joint 10. The closing of socket 20 applies both an axial and compression pre-load, as discussed above.

Figure 3:
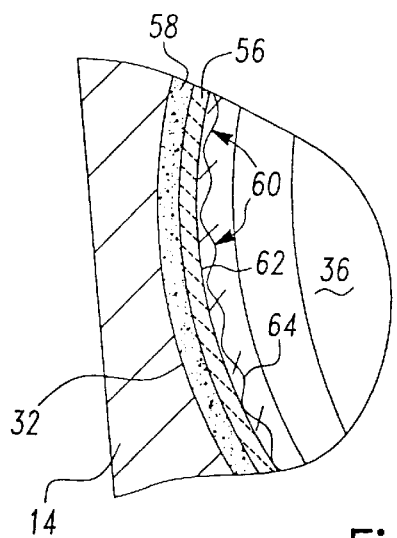
FIG. 3 is a cut away view of the inner bearing surface of the present invention.

A close-up of a portion of joint 10 is illustrated in FIG. 3. Even after surface finishing, ball stud 36 includes a plurality of microscopic surface imperfections 60 which have edges 62 and valleys 64. In conventional ball and socket joint operation, edges 62 tend to scrape any lubricant present from the bearing surface into valleys 64, thus removing lubrication from between areas of frictional contact. In dry bearings, unlubricated edges 62 tend to degrade the interior surface of the bearing, decreasing joint performance and shortening the joint's useful service life. According to the present invention, PTFE-impregnated fabric 56 is bonded with stiff reinforced polymer 58 along inner spherical seat faces 32 and 34 of bearing halves 14 and 16. Fabric 56 is compressed when joint 10 is assembled. As the stud sphere 36 rotates or articulates against the compressed PTFE-impregnated fabric 56, minute particles of PTFE fill in defect valleys 64 until an equilibrium exists between the fabric 56 and stud sphere 36.

Frusto-conical nose 72 of seat 52 acts as a lower seat for ball sphere 36 and acts to offset an effect described as "edge loading" at the edge of the PTFE-impregnated fabric 56. Edge loading occurs at portions of surfaces 32 and 34 having less than a spherical arc, i.e. at longitudinal edges 33 and 35 of surfaces 32 and 34. As sphere 36 exerts a force along longitudinal edges 33 and 35 of surfaces 32 and 34, fabric 56 tends to plastically deform and flow between sphere 36 and bearing halves 14 and 16. The plastic deformation causes a loss of bearing material around sphere 36, leading to premature looseness of stud head 36 within the joint. By supporting sphere 36 along surface 54, edge loading along edges 33 and 35 of surfaces 32 and 34 is minimized.

Impregnated fabric overlay 56 may be bonded to concave surface 54 of seat 52, depending upon the extent and type of loading for which the joint is designed. As the articulation or "tilt" of ball stud 46 about axis of symmetry A-A of ball stud 46 increases, the loading along surface 54 also increases. As loading along surface 54 increases, impregnated fabric overlay 56 bonded thereto minimizes friction.

Preferably, both bearing halves 14 and 16 are metal or very hard polymeric carriers for fabric 56. Pre-compression of hard bearing halves 14 and 16 allows for constant self-adjustment (or "take up") for wear, however small, occurring between the ball sphere 36 and corresponding faces 32 and 34. As wear takes place, some compression pre-loading of the bearing halves is released while still maintaining zero axial or radial play of bearing halves 14 and 16, and head 36 within socket 20. Fabric 56 is also compressed and adjusts for bearing wear. Thus, joint 10 can handle a high radial and axial load forces over an extended period.

Joint 10 is applicable to a wide range of applications, including but not limited to, rack and pinion inner and outer tie rod socket assemblies, upper and lower suspension ball joint assemblies, drag links and connecting rod assemblies, and other "ball and socket" steering knuckles.

FIG. 4 shows an alternative joint configuration 10'. Elements in common with the embodiments of FIGS. 1 through 3 share the same number. Ball stud 46' in FIG. 4 includes a one-third ball stud head 36'. Shank 44' is surrounded by a bushing 66 at the point where ball stud 46' transitions from shank 44' into stud head 36'. Bearing halves 14 and 16 include inner spherical seat faces 32 and 34 which contact an exterior surface 68 of bushing 66 as well as an upper portion 70 of ball stud head 36'. The majority of stud head 36' rests on concave upper surface 54' of plastic lower bearing seat 52'. Inner spherical seat faces 32 and 34 are lined with filament-impregnated fabric overlay 56. In addition, overlay 56 is bonded along inner annular face 82 of bushing 66, in contact with the surface of shank 44', and is also bonded along the portion of bushing 66 in contact with upper portion 70 of stud head 36'. As before, depending upon load requirements of joint 10', surface 54' of seat 52' may also include overlay 56.

In a third embodiment, as shown in FIG. 5, joint 10" may include split bearing halves 14", 16" sized to encompass stud head 36 without need for lower bearing seat 52. Elements in common with the embodiments of FIGS. 1 through 3 share the same number. Hard tapered bearing halves 14" and 16" include inner spherical seat faces 32" and 34" lined with impregnated fabric overlay 56. In this configuration, unit loading is decreased on overlay 56 for compression loading of ball and socket joint 10". When microscopic low places are filled with minute filament particles in the embodiment of FIG. 5, stud head 36 becomes very smooth and joint 10" reaches an "equilibrium" corresponding to its lowest frictional state. Thus, joint 10" achieves an optimal performance level through the present invention.

A fourth embodiment of the present invention using a different ball and socket joint configuration is shown in FIG. 6. Joint 110 includes a bearing set 112 with two tapered, hardened split steel, aluminum, or rigid reinforced polymeric bearing halves 114 and 116 which are received in a cavity 118 of a socket 120, cavity 118 defined by inner peripheral surface 122 of side wall 124. Bearing set 112 is very similar to the embodiment of FIG. 5. A PTFE-impregnated fabric 156 is bonded to inner seat faces 132 and 134 and engages stud head 136. Bearing halves 114 and 116 include outer peripheral surfaces 128 and 130 which are adapted to conform to an inner peripheral surface 122 of cavity 118, but which have a slightly greater unloaded diameter than inner peripheral surface 122.

Bearing halves 114 and 116 are compression pre-loaded by being forced into cavity 118. First, stud head 136 is seated within bearing halves 114 and 116 such that the ball stud head 136 contacts faces 132 and 134. The sub assembly is forced into cavity 118 of socket 120. By forcing the bearing assembly into socket 120, bearing halves 114 and 116 are compression pre-loaded. Fabric 156 is also compressed against sphere 136. Pre-compression of bearing halves 114 and 116 allows for constant self-adjustment (or "take up") for wear, however small, occurring between the ball sphere 136 and corresponding faces 132 and 134. As wear takes place, some compression pre-loading of the bearing halves is released while still maintaining zero axial or radial play of the bearing halves 114 and 116, and head 136 within socket 120. Fabric 156 is also compressed and adjusts for wear of the bearing. Thus, joint 110 can handle a high radial and axial load forces over an extended period.

Socket 120 includes a floor 178 with an aperture 172. A shank 144 of ball stud 146 passes through an aperture 172 formed in socket 120 such that an upper portion 174 of stud head 136 engages inner surface 176 of aperture 172. Shank 144 passes through aperture 172 and upper surfaces 180 and 182 of bearing halves 114 and 116 engage floor 178. Once the sub-assembly is correctly positioned, a solid retaining ring 184 is inserted into cavity 118 and engages surface 186 and 188 of bearing halves 114 and 116. Ring 184 is inserted to provide a longitudinal load on bearing halves 114 and 116. Ring 184 has a diameter generally corresponding to the diameter of cavity 118. Upper axial surface 148 of socket 120 is provided with a crimp 149 to retain ring 184 within joint 110 and to maintain the joint in a pre-loaded condition. To provide additional surface area of contact between a lower axial surfaces 186 and 188, bearing halves 114 and 116 lack a frusto-conical nose. When socket 120 is closed, an axial load is applied to retaining ring 184 which is transferred through bearing set 112 to floor 178 to apply a further compression pre-load to the bearing set.

Figure 7:
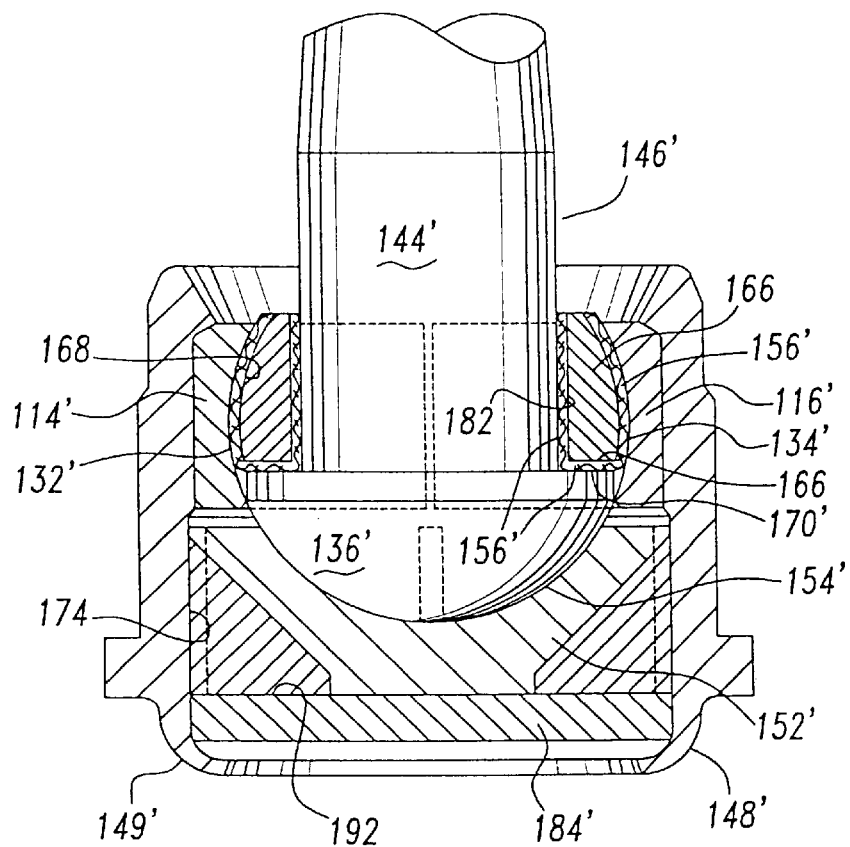
FIG. 7 is a cross-sectional view of a fifth embodiment of the present invention.
Figure 8:
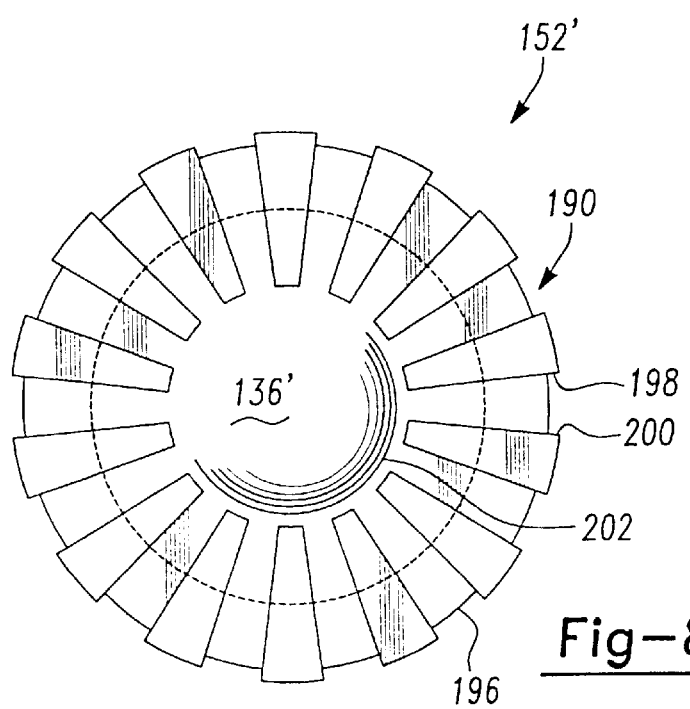
FIG. 8 is a planar view of the lower bearing seat of the fifth embodiment of the present invention.

A fifth embodiment of the present invention, shown in FIGS. 7 and 8, is similar in construction to that shown in FIG. 6. Ball stud 146' in FIG. 7 includes a one-third ball stud head 136'. Shank 144' is surrounded by a bushing 166 at the point where ball stud 146' transitions from shank 144' into stud head 136'. Steel, aluminum, or rigid, reinforced polymeric bearing halves 114 and 116 include inner spherical seat faces 132 and 134 which contact an exterior surface 168 of metallic bushing 166 as well as an upper portion 170 of ball stud head 136'. The majority of stud head 136' rests on concave upper surface 154' of press fit plastic lower bearing seat 152. PTFE-impregnated fabric 156 is bonded along inner spherical seat faces 132 and 134. In addition, PTFE-impregnated fabric is bonded along inner annular face 182 of bushing 166, in contact with the surface of shank 144', and along the portion of bushing 166 in contact with upper portion 170 of stud head 136'.

Lower bearing seat 152' includes a plurality of circumferentially spaced wedge shaped slots 190 defined between lower axial surface 192 and outer peripheral surface 194. Each slot 190 includes a floor 196 and opposing parallel side walls 198 and 200 generally perpendicular to floor 196. Floor 196 extends at a generally constant angle between surfaces 192 and 194. The innermost radial extent of each slot 190 is spaced radially outward from opening 202. Preferably, each slot 190 has a constant width between side walls 198 and 200 or spans an equal number of degrees between a radially innermost and a radially outermost point before being compression pre-loaded. Slots 190 allow bearing seat 152' to elastically deform upon the insertion of ring 184 within socket 120 to create a tight fit between upper surface 154' and an outer surface of stud head 136', maximizing the area of contact between the seat and stud head and minimizing accidental separation. Seat 152' is made from a homogenously self-lubricating material. As a result, surface 154' need not include PTFE-impregnated fabric.

Figure 9:
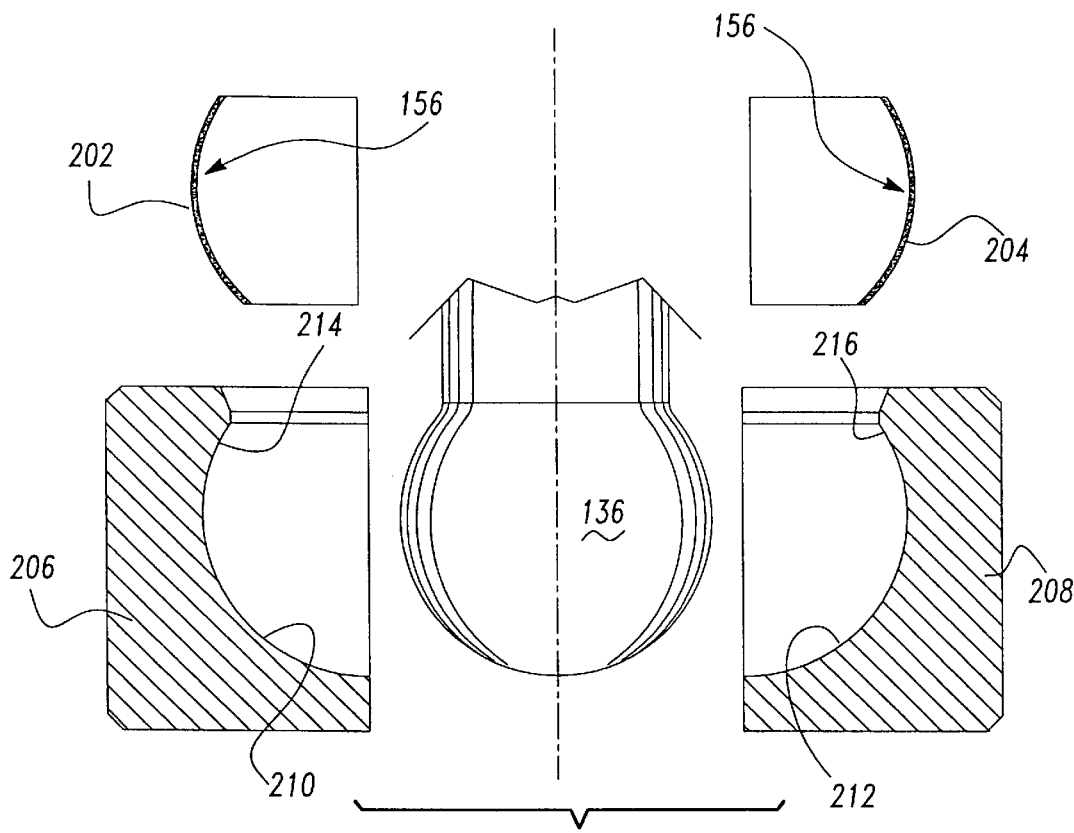
FIG. 9 is a cross-sectional exploded view showing an assembly method for the present invention.
Figure 10:
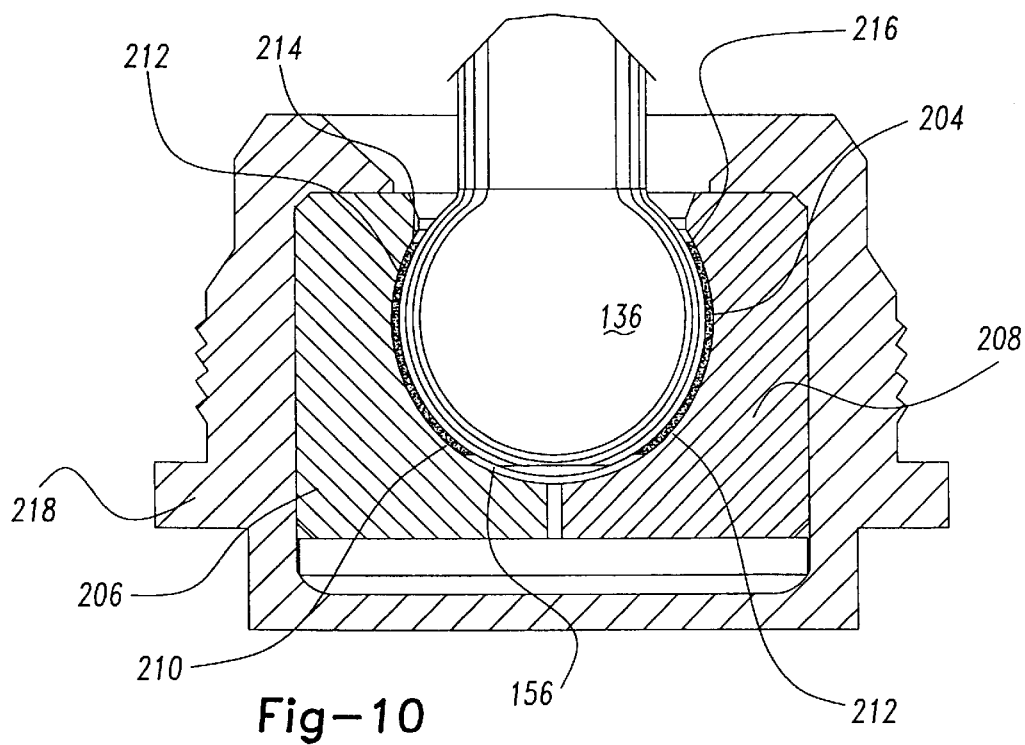
FIG. 10 is the ball and stud head of FIG. 9 in an assembled orientation.

In order to minimize processing costs for implementing the present invention, a method of inserting the fabric adjacent the ball stud head is demonstrated in FIG. 9. A metallic approximately hemispherical cup 200 split into two halves 202 and 204. Low friction synthetic filament impregnated cloth 156 is bonded to inner faces of cup halves 202 and 204 prior to assembly of the ball joint. Cup halves 202 and 204 are sized to fit adjacent inner seat faces 210 and 212 of bearing halves 206 and 208 when the joint is assembled. Inner seat faces 210, 212 include a lip 214, 216 which prevents cup halves 202 and 204 from moving during assembly of the joint. As shown in FIG. 10, to assemble the joint, cup halves 202 and 204 are placed adjacent inner surfaces 210 and 212, and ball stud head 136 is then placed within the cup halves. The outer surface of stud head 136 is therefore in contact with synthetic filament impregnated cloth 156. The assembly is then inserted into a socket 218, where it receives a compression pre-load as described above.

In each embodiment of the present invention, a controlled approach is provided whereby minute particles of PTFE are allowed to accumulate within surface imperfections or defects on a ball stud when the stud articulates or moves within two hard bearing halves. Once surface imperfections are filled with minute particles of PTFE, friction within the joint is minimized, and performance of the joint over its service life is optimized. Further, because of the low frictional state achieved by the invention, each bearing component may be a rigid, hard material, thereby preventing plastic deformation of the bearing halves during assembly. Nor do the inner surfaces of the bearing halves readily deteriorate. Finally, the application of a compression pre-load results in an extremely tight fit of the bearing halves within the socket and of the fabric overlay against the ball stud sphere, thereby promoting the required interaction between the minute particles of PTFE and the ball stud. As a result, the joint life is greatly increased.

The disclosed embodiments and examples are given to illustrate the present invention. But they are not meant to limit the scope and spirit of the present invention. Therefore, the scope of the present invention should be considered by reviewing the appended claims.

What is claimed is:

1. A self-lubricating ball and socket joint, comprising:
   a ball stud having a ball stud head;
   a socket with an inner peripheral surface, said inner peripheral surface defining a first diameter;
   a multi-piece bearing set having an outer wall portion mating with said inner peripheral surface and a concave inner surface receiving said ball stud head, said outer wall portion having an unloaded second diameter greater than said first diameter such that said bearing set is compressed against said stud head when said socket is closed;
   a closure, said closure applying a compression pre-load when said socket is closed;
   a fabric overlay impregnated with a low friction synthetic filament, said overlay bonded to said inner surface in contact with said stud head and subjected to a portion of said compression pre-load, such that as said stud head rotates or articulates against said overlay, minute filament particles fill in any microscopic low places of said stud head until an equilibrium exists between said fabric overlay and said stud head; and
   wherein said joint further includes a supportive lower seat for supporting a portion of said ball stud head, said lower seat including a lower surface for engaging said socket and having a plurality of wedge shaped slots extending about said seat on said lower surface.

2. A ball and socket joint as in claim 1, wherein both said inner peripheral surface of said socket and said outer wall portion of said bearing set are tapered to control the degree of said compression pre-load.

3. A ball and socket joint as in claim 1, wherein said multi-piece bearing set comprises two symmetrical bearing halves.

4. A ball and socket joint as in claim 3, wherein both said stud head and said concave inner surface of said bearing halves are generally spherical.

5. A ball and socket joint as in claim 4, wherein said filament is polytetraflouroethylene.

6. A ball and socket joint as in claim 1, wherein said overlay is bonded to said inner wall using a stiff reinforced polymer.

7. A ball and socket joint as in claim 1, wherein said overlay is bonded to said inner wall using a ceramic based material or other high temperature adhesive.

8. A ball and socket joint as in claim 1, wherein said fabric overlay is polymer based.

9. A ball and socket joint as in claim 1, wherein the supportive lower seat is polymeric and is used to offset edge loading at a longitudinal edge of said fabric overlay.

10. A ball and socket joint as in claim 9, wherein each of said slots includes opposing parallel side walls and a floor defined between and generally perpendicular to said side walls and extends at a generally constant angle from said lower surface.

11. A ball and socket joint as in claim 4, wherein the supportive lower seat is polymeric and is used to offset edge loading at a longitudinal edge of said fabric overlay.

12. A ball and socket joint as in claim 11, wherein said lower seat further includes a concave seat face for receiving said ball stud head, said face having said overlay bonded thereto.

13. A ball and socket joint as in claim 1, wherein said overlay is bonded along an inner surface of a hemispherical cup, said cup placed adjacent said inner surface during assembly before said pre-load is applied.

14. A self-lubricating ball joint, comprising:
   a housing having a first inner wall surface defining a first diameter;
   a hard, multi-piece bearing set fitted in said housing, wherein said bearing is divided by a slot extending axially along said bearing set, said bearing set having a outer wall portion mating with said first inner wall portion and having an unloaded second diameter slightly greater than said first diameter, said bearing set further including a concave inner wall portion receiving a ball stud;
   a fabric overlay impregnated with a low friction synthetic filament, said overlay bonded to said concave inner wall, said bearing set assembled to said ball stud and forced into said housing to cause said bearing set and said overlay to compress and exert a force on said ball stud such that minute filament particles fill any microscopic low places of said ball stud until an equilibrium exists between said overlay and said ball stud; and
   wherein said joint further includes a supportive lower seat having a concave seat face for receiving a portion of said ball stud, said seat face having said fabric overlay bonded thereto.

15. A ball joint as in claim 14, wherein said set is metal.

16. A ball joint as in claim 15, wherein said metal is aluminum.

17. A ball joint as in claim 14, wherein both said inner peripheral surface of said housing and said outer wall portion of said bearing set are tapered to control the degree of said compression pre-load.

18. A ball joint as in claim 17, wherein the joint further includes a closure, said closure applying a compression pre-load on said bearing set and said overlay when said housing is closed.

19. A ball and socket joint as in claim 14, wherein said multi-piece bearing set comprises two symmetrical bearing halves.

20. A ball joint as in claim 18, wherein the supportive lower seat is polymeric and is used to offset edge loading at a longitudinal edge of said overlay.

21. A ball and socket joint as in claim 20, wherein said lower seat further includes a lower surface for engaging said socket and having a plurality of wedge shaped slots extending about said seat on said lower surface, each of said slots including opposing parallel side walls and a floor defined between and generally perpendicular to said side walls and extending at a generally constant angle from said lower surface.

22. An extremely low friction, self-lubricating ball and socket joint having a housing with an inner wall portion and a hard bearing set fitted in the housing, wherein the bearing set is divided into first and second bearing halves by a slot extending axially thereon and has an outer wall portion mating with the inner wall portion, where the outer wall portion has a greater diameter than the inner wall portion, the bearing set further including a concave inner wall portion adapted to receive a ball stud head, formed by the process of:

bonding fabric impregnated with a low friction synthetic filament to inner faces of generally hemispherical cup halves;

inserting the cup halves into respective said first and second bearing halves to define the concave inner wall portion;

packing the ball stud head within the concave inner wall bearing portion to form an assembly;

forcing said assembly within the housing such that the hard bearing set is compression pre-loaded and said fabric is compressed against the stud head; and operating the ball joint so that minute particles of filament fill microscopic low places on the stud head as the stud rotates or articulates against said fabric.

* * * * *